(12) United States Patent
Otsuka

(10) Patent No.: US 8,792,010 B2
(45) Date of Patent: Jul. 29, 2014

(54) IMAGE CAPTURING APPARATUS

(71) Applicant: Canon Kabushiki Kaisha, Tokyo (JP)

(72) Inventor: Genta Otsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/944,371

(22) Filed: Jul. 17, 2013

(65) Prior Publication Data
US 2013/0300882 A1   Nov. 14, 2013

Related U.S. Application Data

(63) Continuation of application No. 12/840,854, filed on Jul. 21, 2010, now Pat. No. 8,542,279.

(30) Foreign Application Priority Data

Aug. 26, 2009 (JP) ................................. 2009-195825

(51) Int. Cl.
H04N 5/228   (2006.01)
G03B 17/00   (2006.01)

(52) U.S. Cl.
USPC .......................................... 348/208.1; 396/52

(58) Field of Classification Search
USPC .......... 348/208.1–208.11; 396/52, 53, 55, 75, 396/133
See application file for complete search history.

(56) References Cited

U.S. PATENT DOCUMENTS 7,324,134 B2 * 1/2008 Sato et al. .................. 348/208.2
2008/0145041 A1 * 6/2008 Enomoto ........................ 396/53
2010/0177197 A1 * 7/2010 Kimura et al. ............. 348/208.2

* cited by examiner

Primary Examiner — Trung Diep
(74) Attorney, Agent, or Firm — Cowan, Liebowitz & Latman, P.C.

(57) ABSTRACT

An image capturing apparatus includes an acceleration sensor having a first measurement axis and a second measurement axis that intersect each other, and arranged on a plane that intersects the imaging optical axis of the image capturing apparatus while inclining the first and second measurement axes by about 45° in the vertical direction, and a calculation unit that calculates the arc tangent of the ratio of the detection result of an acceleration due to gravity by the first measurement axis and the detection result of an acceleration due to gravity by the second measurement axis, thereby obtaining the inclination degree of the image capturing apparatus in the rolling direction.

8 Claims, 11 Drawing Sheets

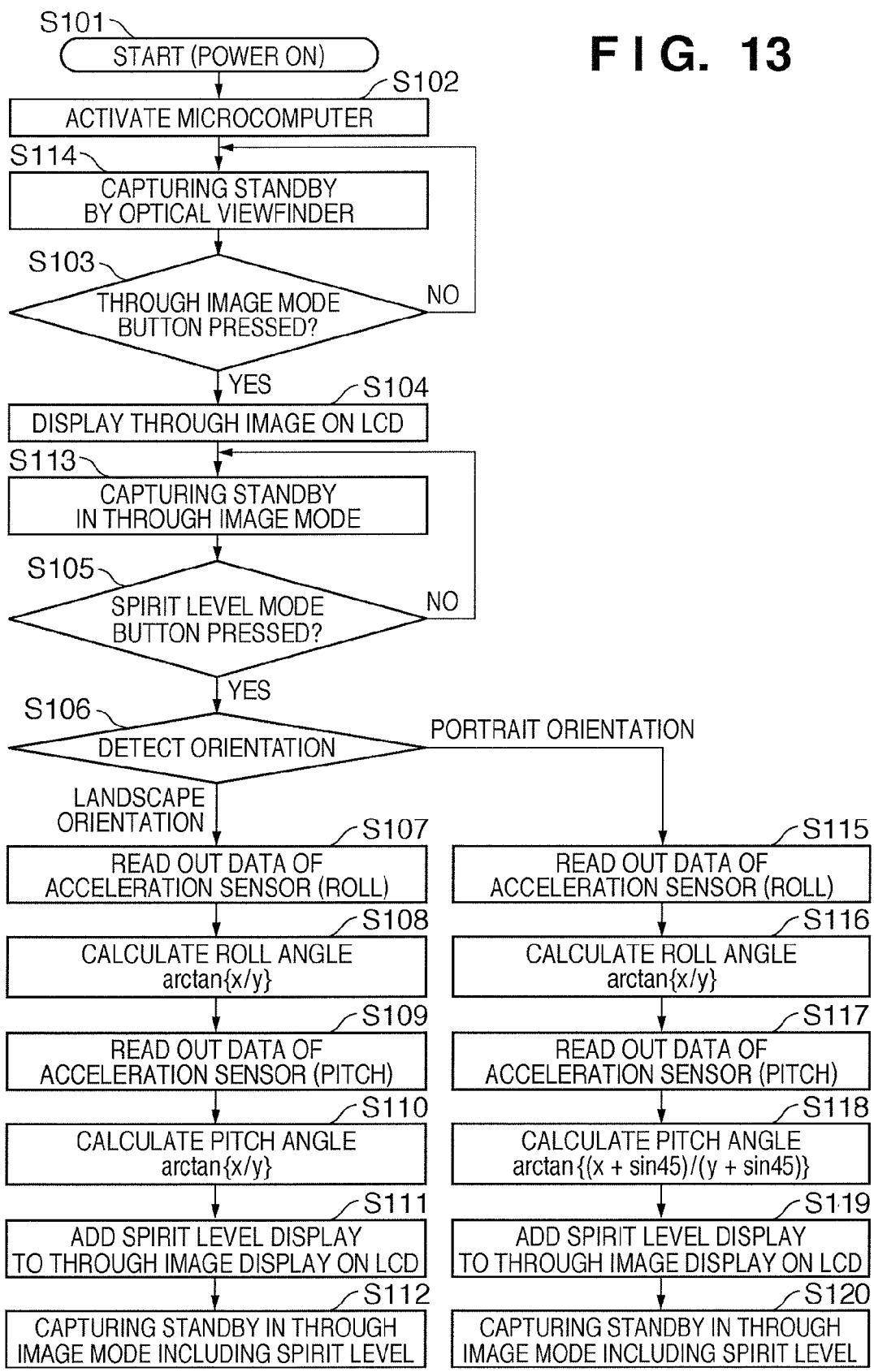

_US 8,792,010 B2_

IMAGE CAPTURING APPARATUS

CROSS-REFERENCE TO RELATED APPLICATIONS

This application is a continuation of application Ser. No. 12/840,854, filed Jul. 21, 2010 the entire disclosure of which is hereby incorporated by reference.

BACKGROUND OF THE INVENTION

1. Field of the Invention

The present invention relates to a sensor attachment structure in an image capturing apparatus such as a digital camera and an electronic spirit level control technology.

2. Description of the Related Art

Recently image capturing apparatus have been proposed such as a digital camera having a function of notifying a user of the degree and direction of its inclination from the horizontal plane or a function of detecting the inclination amount of a captured image and correcting the image inclination by post-processing so as to capture an inclination-free image. These image capturing apparatus include an acceleration sensor to detect inclination.

For example, in Japanese Patent Laid-Open No. 2004-343476, an inclination sensor (acceleration sensor) having two measurement axes is arranged by directing one measurement axis in the horizontal direction and the other in the vertical direction, thereby detecting the inclination degree of the camera in each of its landscape orientation and portrait orientation. The technique disclosed in Japanese Patent Laid-Open No. 2004-343476 changes the measurement axis in accordance with the orientation of the camera under the concept that measurement is done by selectively using a more sensitive measurement axis of the acceleration sensor. For example, in the landscape orientation, the inclination degree from the horizontal plane is measured using the first measurement axis which is arranged in the horizontal direction in that state so as to ensure a high sensitivity of the sensor. When the camera is placed in the portrait orientation, the inclination degree from the horizontal plane is measured using the second measurement axis that is arranged in the horizontal direction in that state so as to ensure a high sensitivity of the sensor. This implements more accurate inclination degree detection.

In the technique described in Japanese Patent Laid-Open No. 2004-343476, however, when arranging the acceleration sensor on a board, the component mounted positions and the attachment position of the board with the mounted components need to be strictly aligned in the roll direction around the imaging optical axis. The reason is as follows. Unless the measurement axis is arranged in the horizontal direction almost without misalignment, when the user swings the camera in the pitch direction, the horizontal point of the measurement axis is shifted by the influence of gravity in the pitch direction even after offset adjustment of the horizontal point. Additionally, if the characteristic such as the sensitivity of the acceleration sensor changes due to the temperature, the horizontal point shifts as the ambient temperature changes. Furthermore, since the measurement axis changes in accordance with the orientation of the camera, the camera needs to be set in two orientations for offset adjustment of the two measurement axes when adjusting offset of the horizontal point at the time of shipment from a factory, resulting in a more complex adjustment process.

SUMMARY OF THE INVENTION

The present invention has been made in consideration of the above-described problems, and accurately detects the orientation of an image capturing apparatus while suppressing labor in component alignment and adjustment.

According to the present invention, there is provided an image capturing apparatus comprising: an acceleration sensor that measures accelerations applied to the image capturing apparatus in a first measurement axis direction and a second measurement axis direction, the first measurement axis direction and the second measurement axis direction intersecting each other; and a calculation unit that calculates an arc tangent of a ratio of an acceleration due to gravity measured by the first measurement axis and an acceleration due to gravity measured by the second measurement axis, thereby obtaining an inclination degree of the image capturing apparatus around an imaging optical axis, wherein the acceleration sensor is arranged so as to make the first measurement axis and the second measurement axis symmetric to each other about an axis in a vertical direction and cause the first measurement axis and the second measurement axis to intersect the imaging optical axis when the image capturing apparatus is placed in a landscape orientation.

Further features of the present invention will become apparent from the following description of exemplary embodiments with reference to the attached drawings.

BRIEF DESCRIPTION OF THE DRAWINGS

FIG. 13 is a flowchart illustrating an operation according to the second embodiment.

DESCRIPTION OF THE EMBODIMENTS (First Embodiment)

Figure 1:
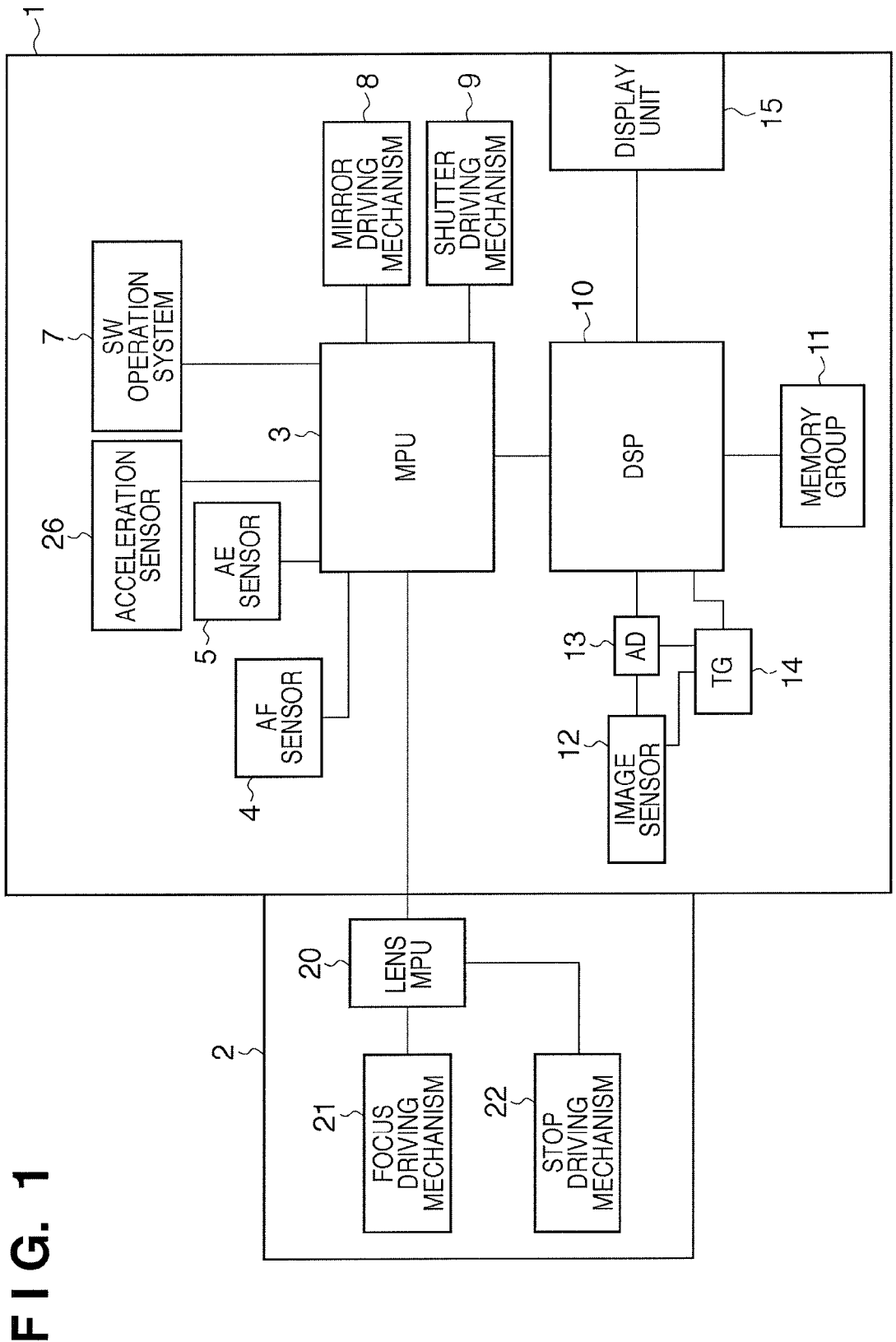
FIG. 1 is a block diagram showing the arrangement of a digital single-lens reflex camera serving as an image capturing apparatus according to the first embodiment of the present invention.

FIG. 1 is a block diagram showing the arrangement of a digital single-lens reflex camera serving as an image capturing apparatus according to the first embodiment of the present invention.

Referring to FIG. 1, reference numeral 1 denotes a camera body. An imaging lens 2 forms an object image on an image sensor 12 in the camera body 1. An MPU (Micro Processing Unit) 3 is a microprocessor which controls the entire camera body 1. The MPU 3 controls an AF sensor 4 to bring an object into focus, performs calculations to set focus based on an image obtained from the AF sensor 4, and communicates with a lens MPU 20 to drive a focus driving mechanism 21 of the imaging lens 2 based on the calculation result. The MPU 3 also controls an AE sensor 5 to do photometric measurement for the object and, based on information obtained from the AE sensor 5, controls an exposure calculation program to determine the combination of the shutter speed and aperture value in accordance with a set ISO sensitivity. In addition, the MPU 3 receives information from an SW operation system (switch operation system) 7 including the release button, electronic dial, and the like and serving as a user interface. The MPU 3 also controls a mirror driving mechanism 8 for driving a main mirror (not shown) so as to separate the object image formed by the imaging lens 2 into the viewfinder system and the imaging system. The MPU 3 also controls a shutter driving mechanism 9 for driving a focal plane shutter having front and rear curtains in accordance with a shutter speed determined by a program in the camera using the information obtained from the AE sensor 5.

An acceleration sensor 26 detects an inclination angle in the roll direction (rolling direction) around the imaging optical axis of the camera body 1. The acceleration sensor 26 is connected to the MPU 3. The MPU 3 calculates the inclination angle in the roll direction using information obtained from the acceleration sensor 26, and causes a display unit 15 to display the inclination degree of the camera body via a DSP (Digital Signal Processor) 10.

The operation of the imaging lens 2 will be described next. The lens MPU 20 of the imaging lens 2 receives, from the MPU 3, focus information calculated by the MPU 3, and based on the result, controls the focus driving mechanism 21 for driving a focus adjusting lens to set focus. The lens MPU 20 also receives, from the MPU 3, an aperture value calculated by the MPU 3, and based on the result, controls a stop driving mechanism 22 for controlling the diaphragm blades to obtain a predetermined exposure value.

Digital units 10 to 15 in the camera body 1 will be explained next. The image sensor 12 photoelectrically converts object light, and outputs an analog image signal. An A/D converter 13 converts the analog image signal output from the image sensor 12 into a digital image signal. A TG (Timing Generator) 14 controls driving of the image sensor 12, and also transmits a synchronization clock for A/D conversion to the A/D converter 13 in synchronism with the analog image signal output from the image sensor 12. The TG 14 also transmits, to the DSP 10, a timing clock signal to latch the data output from the A/D converter 13 so as to control digital data transfer from the A/D converter 13 to the DSP 10. The memory group 11 includes a RAM capable of temporarily storing data for processing, and a recording medium capable of recording image data processed by the DSP 10. The display unit 15 is formed from a liquid crystal panel to display an image or capturing information.

Figure 2:
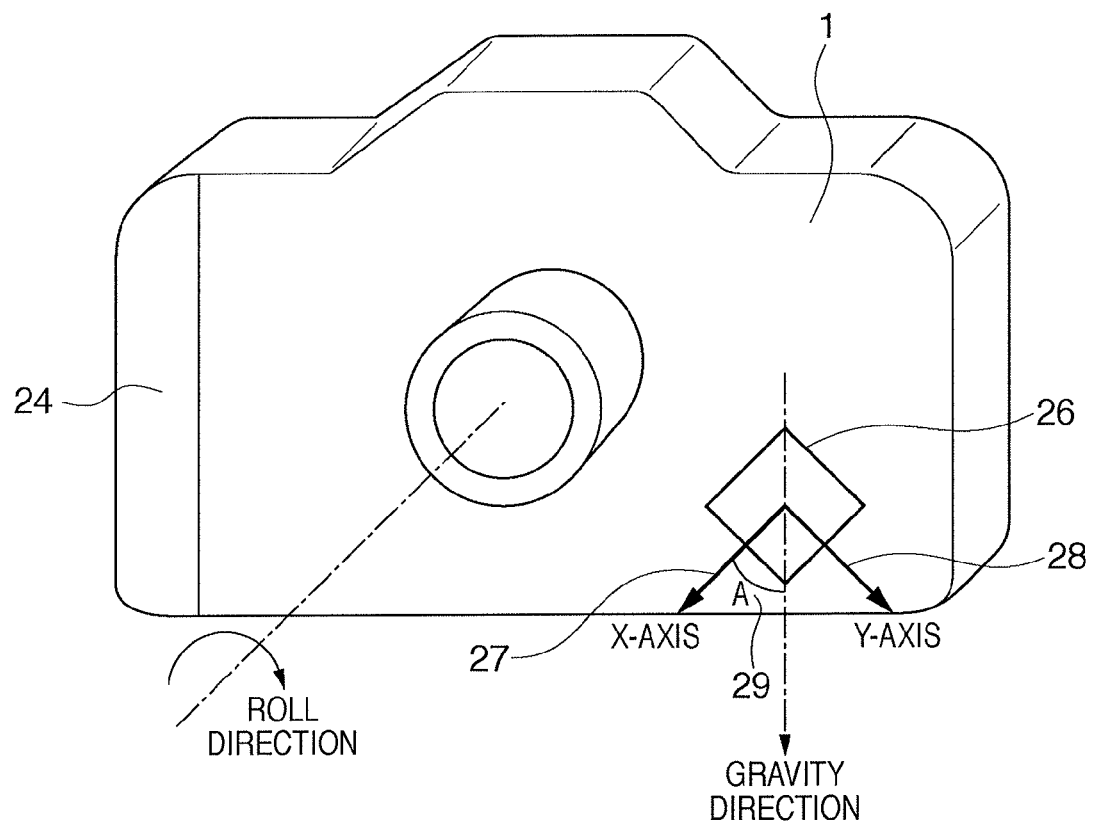
FIG. 2 is a perspective view showing the arrangement of an acceleration sensor in a camera body according to the first embodiment.
Figure 3:
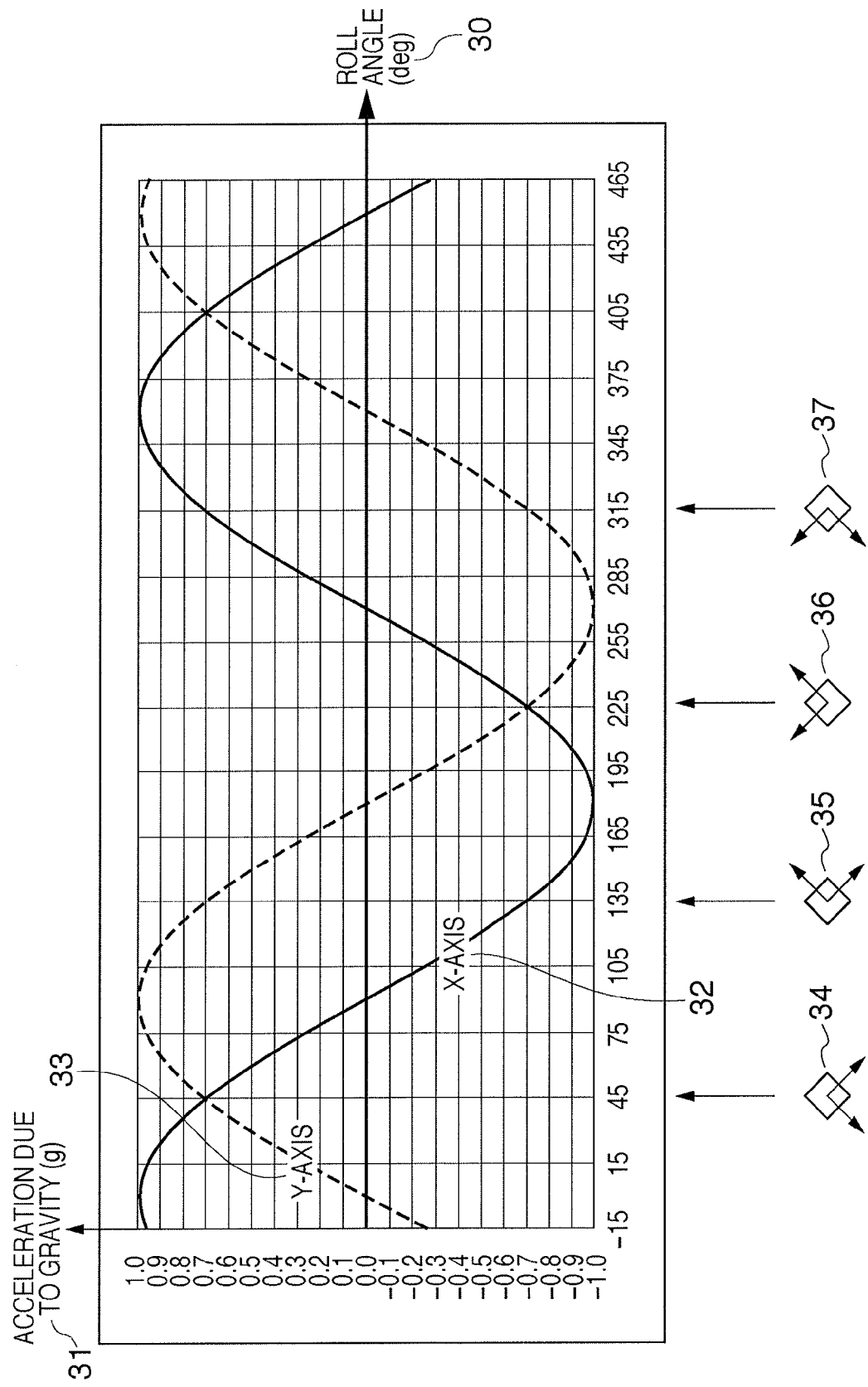
FIG. 3 is a graph showing the output characteristic of the acceleration sensor according to the first embodiment.

An acceleration sensor arrangement and the output of the acceleration sensor according to the camera orientation will be described next with reference to FIGS. 2 and 3.

The arrangement of the acceleration sensor 26 in the camera body 1 will be described first with reference to FIG. 2. The acceleration sensor 26 has two measurement axes, and can measure the acceleration in the first measurement axis direction and that in the second measurement axis direction. A first measurement axis 27 of the acceleration sensor 26 will be defined as the X-axis. A second measurement axis 28 of the acceleration sensor 26 will be defined as the Y-axis that intersects the first measurement axis at a right angle in this embodiment. The acceleration sensor 26 is arranged such that the plane formed from the X- and Y-axes, that is, the two measurement axes of the acceleration sensor is located on a plane perpendicular to the optical axis of the camera, and the X-axis inclines by a predetermined angle A 29 from the gravity direction (vertical direction). In this embodiment, the predetermined angle A 29 is 45°. The Y-axis intersects the X-axis at a right angle. For this reason, the Y-axis is symmetric to the X-axis about the gravity direction (vertical direction), and both axes incline by 45° from the gravity direction (vertical direction).

The output characteristic of the acceleration sensor 26 when the camera body 1 in FIG. 2 inclines in the roll direction will be described next with reference to FIG. 3. The abscissa of the graph in FIG. 3 represents the roll angle that is the inclination angle in the roll direction, that is, around the imaging optical axis of the camera, and the ordinate represents the acceleration due to gravity measured by the acceleration sensor. When a measurement axis of the acceleration sensor is directed in the same direction as the gravity direction (parallel to the gravity direction), the output of the acceleration sensor is 1.0 g. When a measurement axis of the acceleration sensor is directed in the direction of horizontal plane, the output of the acceleration sensor is 0.0 g. Note that g is the acceleration due to gravity. Reference numeral 32 indicates an output of the first measurement axis, that is, X-axis of the acceleration sensor; and 33, an output of the second measurement axis, that is, Y-axis of the acceleration sensor. In addition, 34 to 37 indicate acceleration sensor outputs corresponding to the inclination angles of the camera (acceleration sensor 26) in the roll direction.

When the camera body 1 is set in the landscape orientation, the X- and Y-axes incline by 45° from the gravity direction, as indicated by 34. Both the outputs of the X- and Y-axes are $\cos(45°) \cdot g \approx 0.7$ g. The inclination degree is calculated by $$\text{Inclination degree} = \arctan(X\text{-axis data}/Y\text{-axis data}) \quad (1)$$

where arctan is the arc tangent, and X-axis data and Y-axis data are outputs of the X- and Y-axes which are accelerations due to gravity measured by the acceleration sensor. Hence, the inclination degree in the state 34 is calculated as arctan (0.7 g/0.7 g)=45°.

When a grip 24 of the camera body 1 faces down, the camera is set in the portrait orientation 35. The inclination degree in the orientation 35 is calculated as arctan(−0.7 g/0.7 g)=135°.

When the camera body is set upside down, the camera body is set in the orientation 36. The inclination degree in the orientation 36 is calculated as arctan(−0.7 g/−0.7 g)=225°.

When the grip of the camera body 1 faces up, the camera is set in the portrait orientation 37. The inclination degree in the orientation 37 is calculated as arctan(0.7 g/−0.7 g)=315°.

As for the inclination degree of the camera, when the normal landscape orientation is defined as 0°, an angle obtained by subtracting 45° from the above-described calculation result is the inclination degree of the camera. In the orientations 34, 35, 36, and 37, both measurement axes of the acceleration sensor use the sensitivity corresponding to about 70% of the maximum sensitivity. It is therefore possible to obtain a sufficiently high horizontal point detection accuracy in each orientation.

In this embodiment, even when the first measurement axis 27 is slightly shifted from the position of 45° with respect to the gravity direction due to the variation in the attachment accuracy of the acceleration sensor 26, it is not influenced by swing in the pitch direction upon detecting the roll angle. Even when the user swings the camera body 1 in the pitch direction, the measurement axes 27 and 28 uniformly measure the accelerations due to gravity corresponding to the pitch angle. Hence, the influence of the pitch angle can be canceled by arc tangent calculation. For example, if the measurement axis 27 is arranged while being shifted by about 3°, the roll angle is detected by $$\arctan\{\cos(42°)\cdot g/\cos(-48°)\cdot g\}=42 \text{ deg}$$

The horizontal point is defined at 42 deg by offset adjustment. When the user swings the camera by 10° in the horizontal direction in this state, $$\arctan[\{\cos(42°)\cdot g\cdot\sin(10°)\}/\{\cos(-48°)\cdot g\cdot\sin(10°)\}]= \arctan\{\cos(42°)\cdot g/\cos(-48°)\cdot g\}=42 \text{ deg}$$

The influence in the pitch direction is thus canceled.

In this embodiment, even when the sensitivity of the acceleration sensor 26 changes depending on the temperature, temperature characteristics Tx and Ty of the sensitivity of the measurement axes 27 and 28 hold Tx≈Ty, and the influence of the temperature change can be canceled by arc tangent calculation of the measurement axes 27 and 28 by $$\arctan[\{\cos(45°)\cdot g\cdot Tx\}/\cos(-45°)\cdot g\cdot Ty\}]\approx \arctan\{\cos(45°)\cdot g/\cos(-45°)\cdot g\}45 \text{ deg}$$

In this embodiment, angle calculation is always done by the arc tangents of the two results of the measurement axes 27 and 28. For this reason, executing offset adjustment only for the orientation at one point enables offset adjustment of the two axes.

Figure 4:
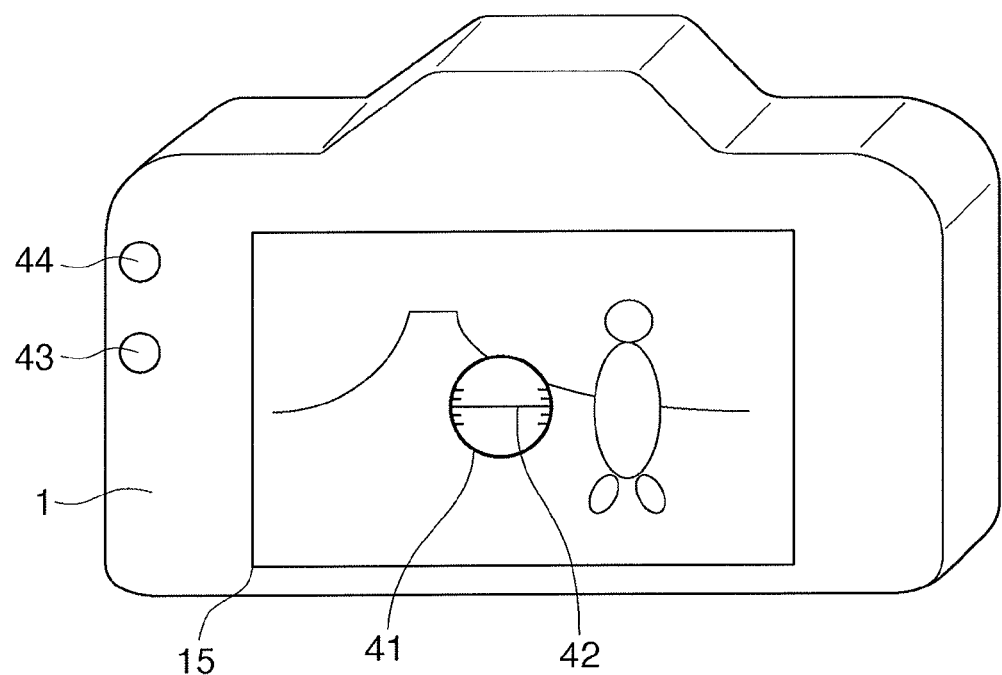
FIG. 4 is a perspective view showing a display example of an electronic spirit level according to the first embodiment.
Figure 5:
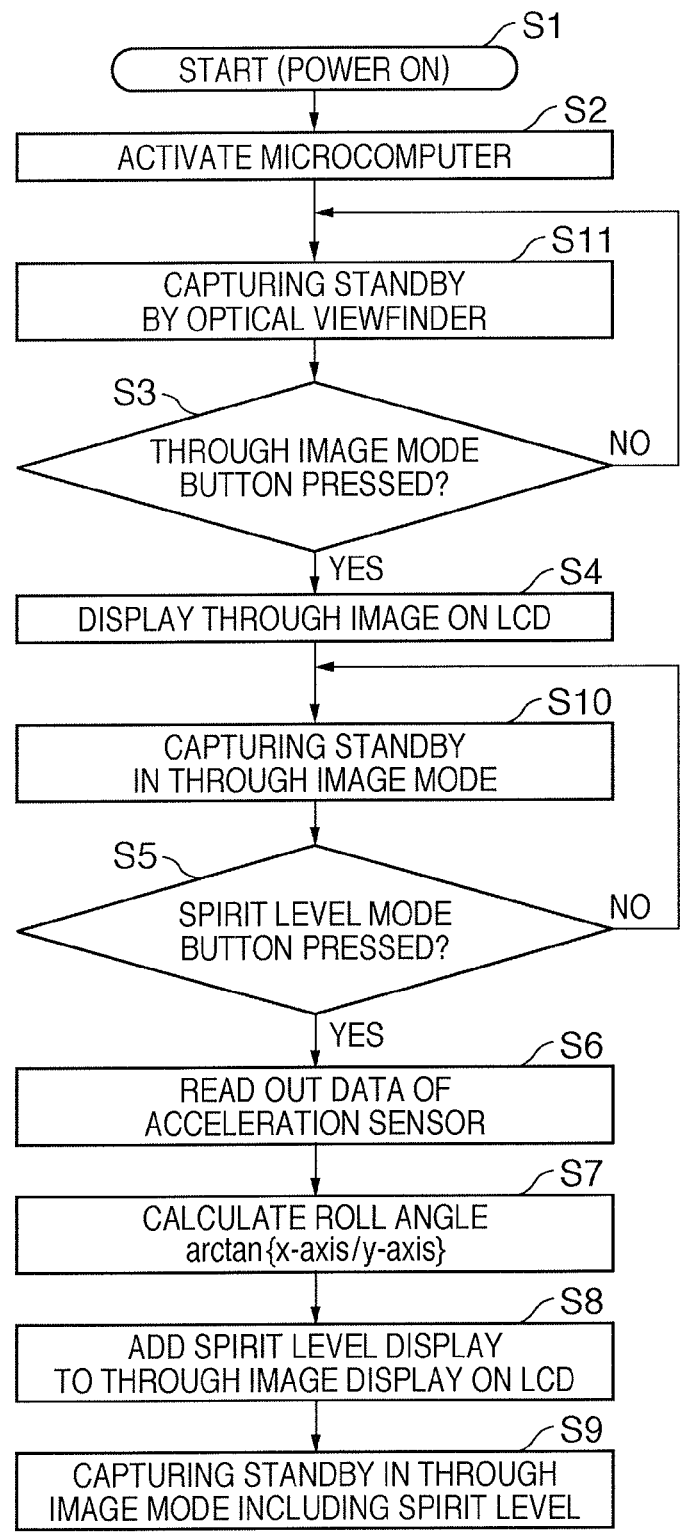
FIG. 5 is a flowchart illustrating an operation according to the first embodiment.

The operation of the spirit level of the image capturing apparatus will be described next with reference to FIGS. 4 and 5. FIG. 4 is a perspective view showing an example in which a captured through image and a spirit level are displayed on the display unit attached to the rear surface of the camera body. The display unit 15 is formed from a TFT liquid crystal or the like. A level indicator 41 displays the inclination degree of the camera. An indicator bar 42 indicates the inclination degree. When the camera body 1 inclines in the roll direction, the relative position between the indicator bar and the scales of the level indicator changes to display the inclination amount. A button SW (switch) 44 is used to set the through image mode. The MPU 3 detects press of the button SW 44, and the camera transits to the through image mode (live view mode). A button SW 43 is used to set the spirit level display mode. The MPU 3 detects press of the button SW 43, and the camera adds the spirit level display to the through image display.

The operation will be described next with reference to FIG. 5. When the user turns on the main SW included in the SW operation system 7 of the camera body 1 (step S1), the MPU 3 is activated (step S2), and the camera is temporarily set in a capturing standby mode by the optical viewfinder (step S11). When the user presses the button SW 44 serving as the through image mode button (YES in step S3), the MPU 3 operates the mirror driving mechanism 8 to set the mirror in a mirror up state, and also operates the shutter driving mechanism 9 to open the shutter. Simultaneously, the MPU 3 instructs the DSP 10 to output a through image.

The DSP 10 controls the TG 14 to operate the image sensor 12 and the A/D converter 13, internally executes predetermined image processing for image signals sequentially output from the image sensor, and causes the display unit 15 to perform through image display (step S4). The camera is set in a capturing standby mode by the through image display (step S10). When the user then presses the button SW 43 (part of the SW operation system 7) for the spirit level display (YES in step S5), the MPU 3 drives the acceleration sensor 26, and reads out the outputs of the X- and Y-axes of the acceleration sensor at a predetermined time interval (step S6). The inclination degree of the camera in the roll direction is calculated by arctan(X-axis data/Y-axis data) of equation (1) (step S7). The result is sent to the DSP 10 at a predetermined interval. Based on the result, the DSP 10 adds spirit level display to the through image on the display unit 15 (step S8). As a consequence, the camera transits to a through image capturing mode including the spirit level display (step S9). The user can capture an image while determining the presence/absence of inclination of the captured image.

(Second Embodiment)

Figure 6:
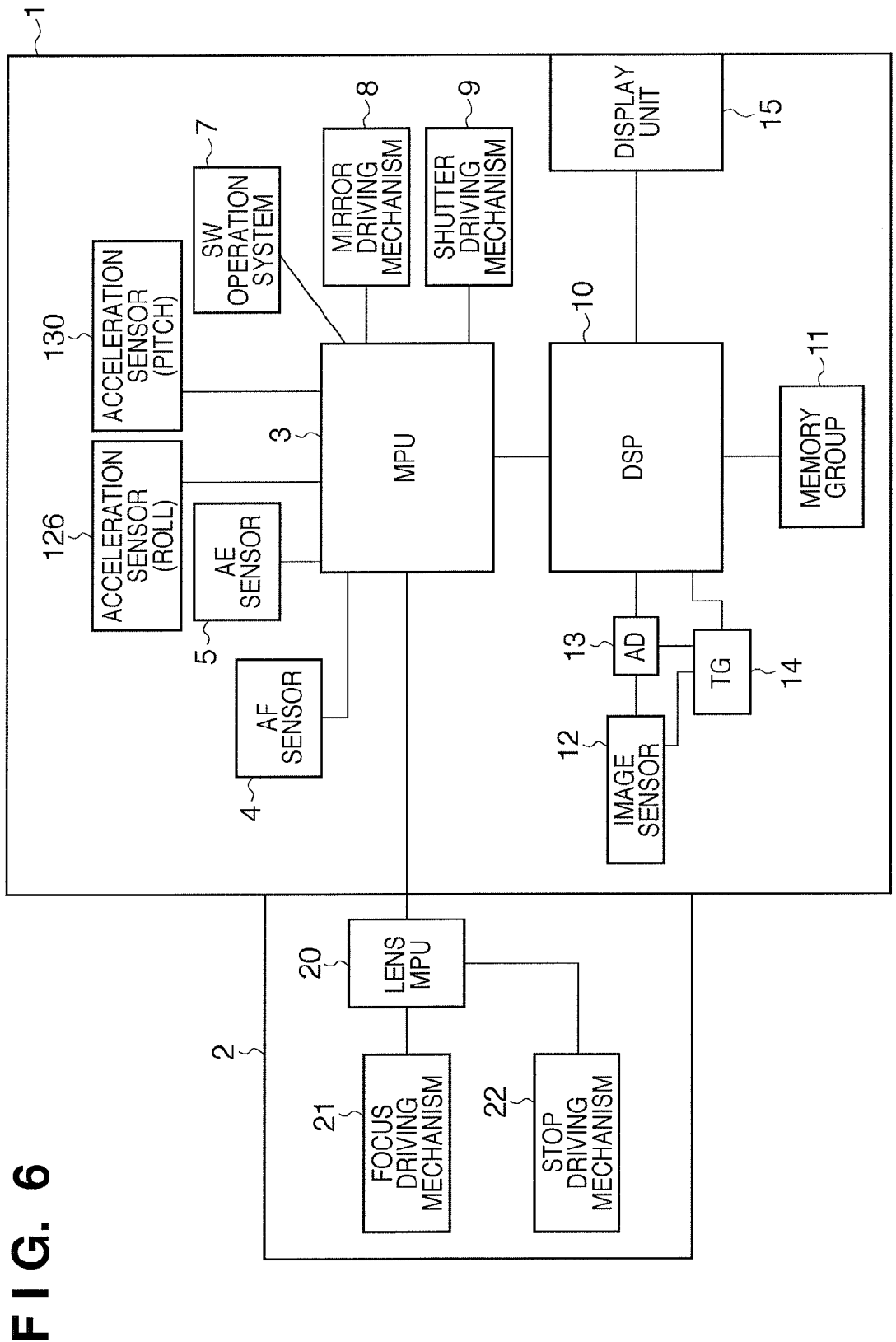
FIG. 6 is a block diagram showing the arrangement of a digital camera according to the second embodiment.

FIG. 6 is a block diagram showing the arrangement of a digital camera according to the second embodiment of the present invention. In the second embodiment, not only the inclination degree in the roll direction according to the first embodiment but also the inclination degree in the pitch direction of the camera is detected. The arrangement in FIG. 6 includes many parts common to the first embodiment shown in FIG. 1, and only different parts will be described. The same reference numerals as in FIG. 1 denote the same parts in FIG. 6, and a description thereof will not be repeated.

An acceleration sensor 126 detects the inclination degree of the camera in the roll direction (rolling direction), and is connected to an MPU 3. The MPU 3 calculates the inclination degree in the roll direction based on information obtained from the acceleration sensor 126, and causes a display unit 15 to display the inclination degree of a camera body 1 via a DSP 10. An acceleration sensor 130 detects the inclination degree of the camera in the pitch direction (pitching direction), and is connected to the MPU 3. The MPU 3 calculates the inclination degree in the pitch direction based on information obtained from the acceleration sensor 130 (second acceleration sensor), and causes the display unit 15 to display the inclination degree of the camera body 1 via the DSP 10.

The arrangement of the acceleration sensor for roll angle detection and the acceleration sensor for pitch angle detection and the outputs of the acceleration sensors corresponding to camera orientations will be described next with reference to FIGS. 7, 8, 9, and 10.

Figure 7:
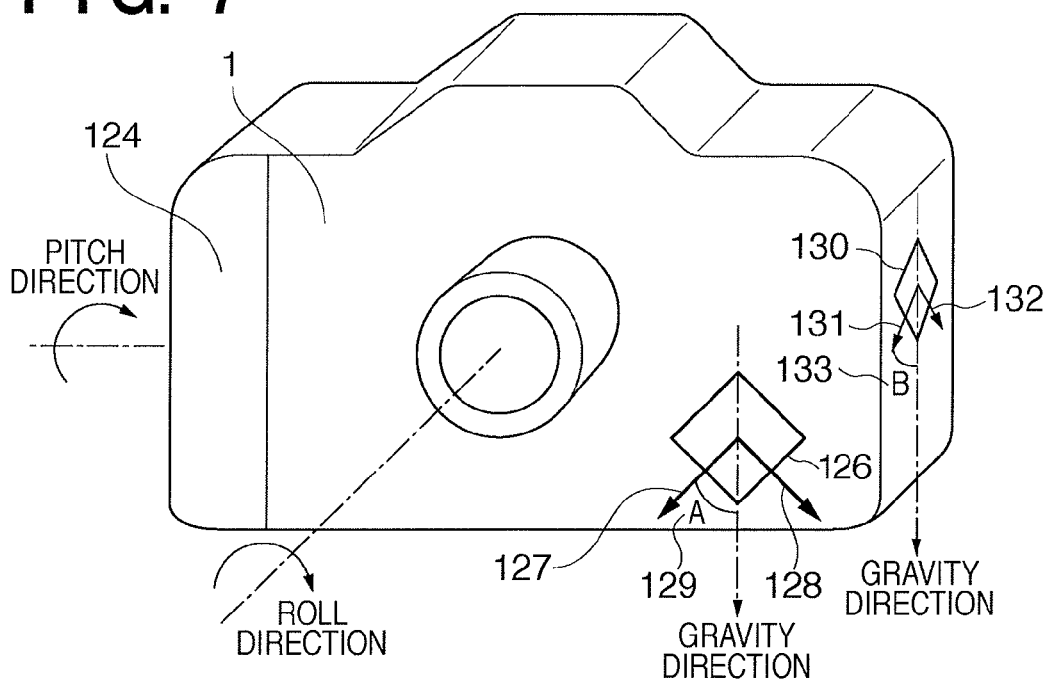
FIG. 7 is a perspective view showing the arrangement of an acceleration sensor according to the second embodiment when the camera body is set in a landscape orientation.

The arrangement of the acceleration sensors 126 and 130 in the camera body 1 will be described first with reference to FIG. 7. FIG. 7 shows a state in which the camera body is placed in a normal landscape orientation. The arrangement of the acceleration sensor 126 in FIG. 7 is the same as that of the acceleration sensor 26 of the first embodiment. Measurement axes 127 and 128 and an angle 129 are the same as the measurement axes 27 and 28 and the predetermined angle 29 of the first embodiment. The acceleration sensor 130 has two measurement axes, and can measure the acceleration in the third measurement axis direction and that in the fourth measurement axis direction. A first measurement axis (third measurement axis) 131 of the acceleration sensor 130 for pitch angle detection will be defined as the X-axis. A second measurement axis (fourth measurement axis) 132 of the acceleration sensor 130 for pitch angle detection will be defined as the Y-axis that intersects the measurement axis 131 at a right angle in this embodiment. The acceleration sensor 130 for pitch angle detection is arranged on a plane which is parallel to the imaging optical axis of the image capturing apparatus and also parallel to the gravity direction when the image capturing apparatus is placed in the normal landscape orientation (FIG. 7). The first measurement axis (X-axis) inclines by a predetermined angle B 133 with respect to the gravity direction (vertical direction). In this case, the predetermined angle B 133 is 45°. The Y-axis intersects the X-axis at a right angle. For this reason, the Y-axis is symmetric to the X-axis about the gravity direction (vertical direction), and both axes incline by 45° from the gravity direction (vertical direction).

Figure 8:
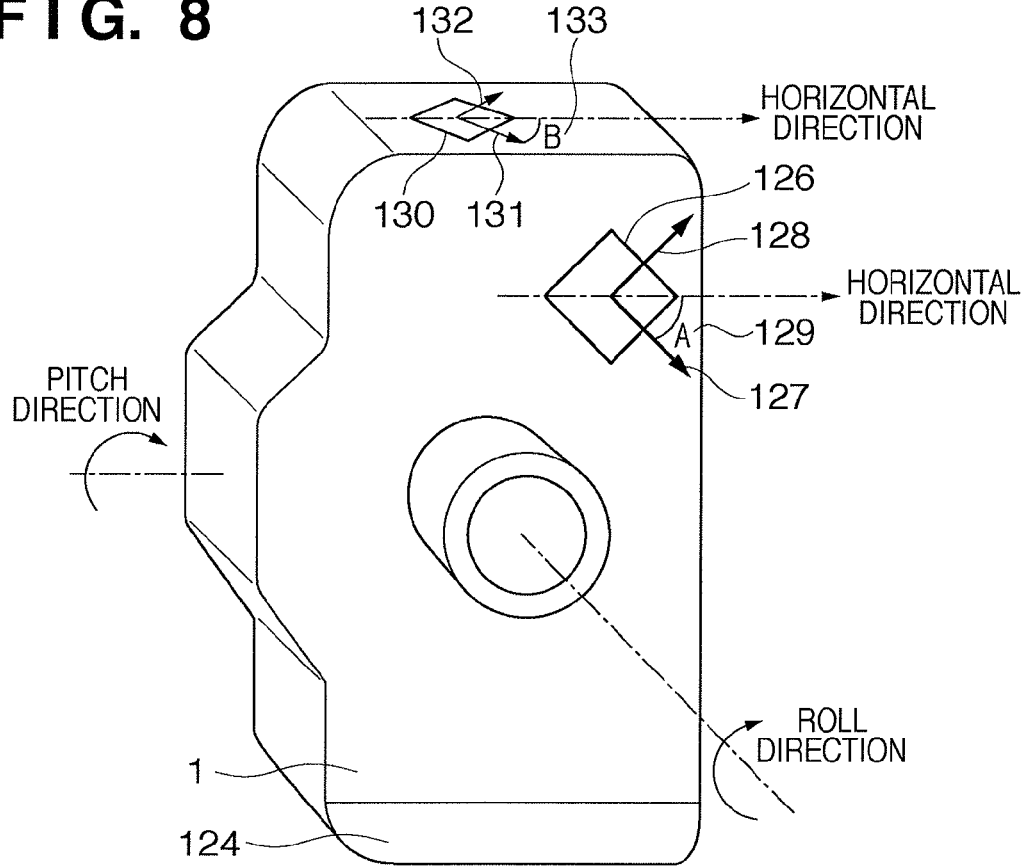
FIG. 8 is a perspective view showing the arrangement of the acceleration sensor according to the second embodiment when the camera body is set in a portrait orientation.

FIG. 8 shows a state in which the camera in FIG. 7 is placed in a portrait orientation (with a grip 124 facing down). The detection method in the roll direction is the same as that in the landscape orientation. However, the detection method in the pitch direction is different from that in the landscape orientation. This will be described later in detail.

The output signal characteristic of the acceleration sensor 126 when the camera body 1 in FIG. 8 inclines in the roll direction and the output signal characteristic of the acceleration sensor 130 when the camera body 1 inclines in the pitch direction will be described next with reference to FIG. 9.

Figure 9:
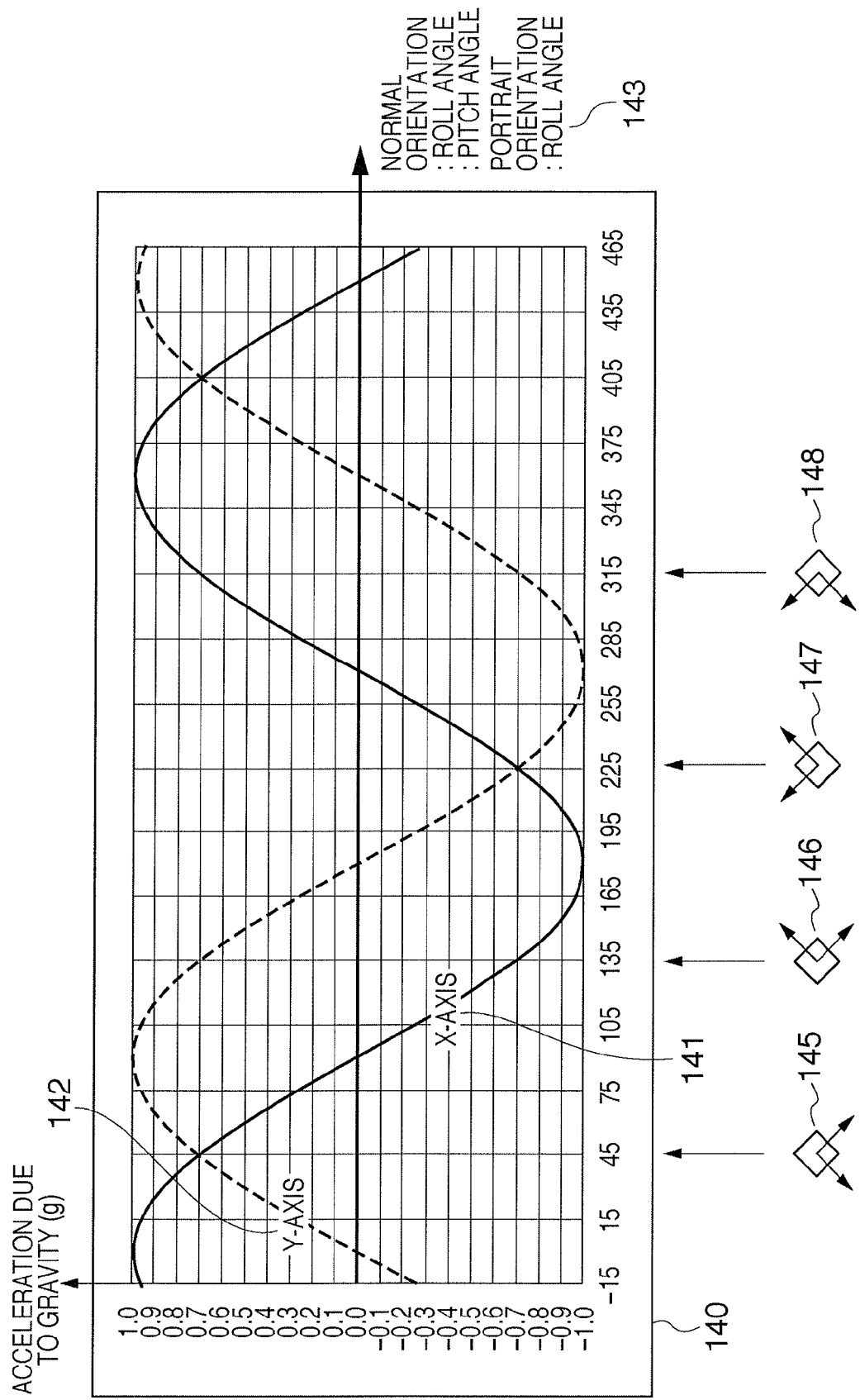
FIG. 9 is a graph showing the output characteristic of the acceleration sensor according to the second embodiment.

The abscissa of the graph in FIG. 9 represents the inclination angle of the acceleration sensor 126 in the roll direction when the camera is placed in the landscape orientation and portrait orientation, and the inclination angle of the acceleration sensor 130 in the pitch direction when the camera is placed in the landscape orientation. The ordinate represents the acceleration due to gravity measured by each acceleration sensor. When a measurement axis of the acceleration sensor is directed in the same direction as the gravity direction (parallel to the gravity direction), the output is 1.0 g. When a measurement axis of the acceleration sensor is directed in the direction of horizontal plane, the output is 0.0 g. In addition, 145 to 148 indicate acceleration sensor outputs corresponding to the inclination angles of the camera in the roll direction.

Reference numeral 141 indicates a signal of the first measurement axis, that is, X-axis of each of the acceleration sensors 126 and 130; and 142, a signal of the second measurement axis, that is, Y-axis of each of the acceleration sensors 126 and 130.

When the camera body 1 is set in the normal landscape orientation, the acceleration sensors 126 and 130 are in the state 145 in which the X- and Y-axes incline by 45° from the gravity direction. Both the outputs of the X- and Y-axes are) cos(45°)·g≈0.7 g. The inclination degree is calculated by $$\text{Inclination degree}=\arctan\{X\text{-axis data}/Y\text{-axis data}\} \quad (2)$$

At this time, arctan(0.7 g/0.7 g)=45°. The outputs obtained when the camera in the landscape orientation or portrait orientation inclines in the roll direction are the same as those described with reference to FIG. 3, and a description thereof will not be repeated here.

When the camera body 1 placed in the normal landscape orientation inclines in the pitch direction, for example, when the camera inclines so as to direct the imaging lens in the same direction as the gravity direction, the acceleration sensor 130 for pitch angle detection is set in the state 146. At this time, arctan(−0.7 g/0.7 g)=135°. When the camera further inclines in the pitch direction by 90°, that is, when the camera body is placed upside down, the acceleration sensor 130 is set in the state 147. At this time, arctan(−0.7 g/−0.7 g)=225°. When the camera further inclines in the pitch direction by 90°, that is, when the imaging lens is directed in a direction exactly opposite to the gravity direction, the acceleration sensor 130 is set in the state 148. At this time, arctan(0.7 g/−0.7 g)=315°. As for the inclination degree of the camera, when the normal position at which an imaging lens 2 faces the front side is defined as 0°, a value obtained by subtracting 45° from the above-described calculation result is the inclination angle of the camera in the pitch direction.

In the above-described orientations, both measurement axes of the acceleration sensors use the sensitivity corresponding to about 70% of the maximum sensitivity. It is therefore possible to obtain a sufficiently high horizontal point detection accuracy in each orientation.

The output signal characteristic of the acceleration sensor 130 when the camera body 1 placed in the portrait orientation (the state in FIG. 9) rotates in the pitch direction will be described next with reference to FIG. 10.

Figure 10:
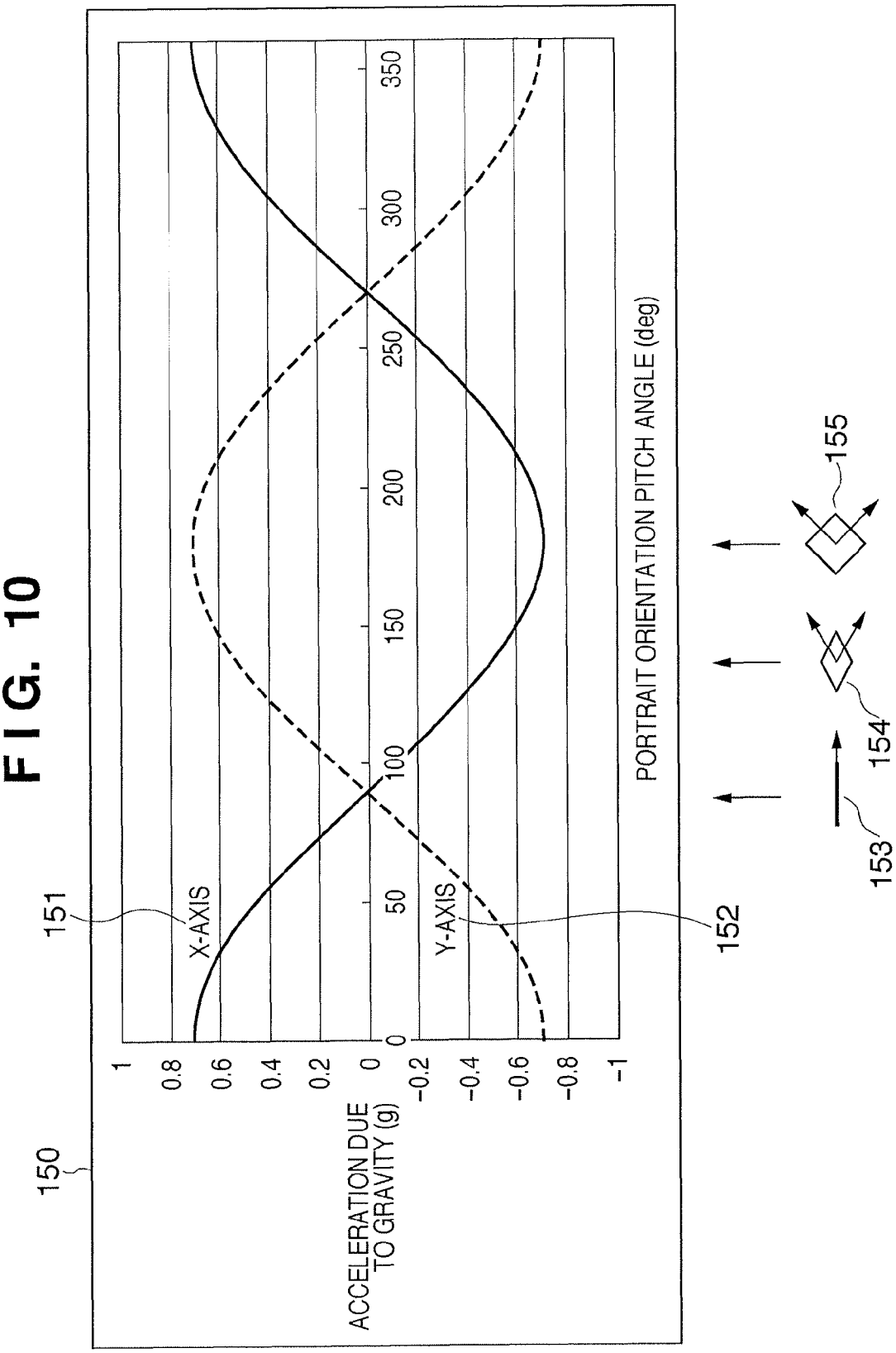
FIG. 10 is a graph showing the output characteristic of the acceleration sensor according to the second embodiment when the camera set in the portrait orientation inclines in the pitch direction.

The abscissa of the graph in FIG. 10 represents the inclination angle of the acceleration sensor 130 in the pitch direction when the camera is placed in the portrait orientation. The ordinate represents the acceleration due to gravity measured by the acceleration sensor. When a measurement axis of the acceleration sensor is directed in the same direction as the gravity direction (parallel to the gravity direction), the output is 1.0 g. When a measurement axis of the acceleration sensor is directed in the direction of horizontal plane, the output is 0.0 g. In addition, 153 to 155 indicate measurement axis directions corresponding to the abscissa of the graph when the measurement axes of the acceleration sensor 130 are viewed from the optical axis side in the portrait orientation of the camera body (FIG. 8). Reference numeral 151 indicates a signal of the first measurement axis, that is, X-axis of the acceleration sensor 130; and 152, a signal of the second measurement axis, that is, Y-axis of the acceleration sensor 130.

When the camera body 1 is set in the portrait orientation shown in FIG. 8, the acceleration sensor 130 is set in the state 153, and the X- and Y-axes incline by 90° from the gravity direction. Both the outputs of the X- and Y-axes are) cos(90°)·g=0 g. Since the maximum acceleration due to gravity measured by a measurement axis of the acceleration sensor 130 at the rotation angle in the pitch direction is sin(45°)·g≈0.7 g, the inclination degree is calculated by $$\text{Inclination degree}=\arctan(X\text{-axis data}+0.7\ g)/ (Y\text{-axis data}+0.7\ g) \quad (3)$$

Hence, in the state 153 corresponding to the portrait orientation shown in FIG. 8, the inclination angle at the position 153 is calculated as arctan{(0 g+0.7 g)/(0 g +0.7 g)}=45°. Since the output result is offset by 45° in this graph, the abscissa corresponds to 90°.

In the state 154, the camera body 1 inclines by 45° in the pitch direction so as to direct the lens upward.

The inclination degree in the state 154 is calculated as arctan{(0.5 g+0.7 g)/(−0.5 g+0.7 g)}=90°. Since the result in this graph is offset by 45°, as described above, the abscissa corresponds to 135°.

In the state 155, the camera body further inclines by 45° so as to direct the lens upward, that is, exactly upward.

The inclination degree in the state 155 is calculated as arctan{(0.7 g+0.7 g)/(−0.7 g+0.7 g)}=135°. Since the result in this graph is offset by 45°, as described above, the abscissa corresponds to 180°.

In the above-described portrait orientation (FIG. 8), both measurement axes of the acceleration sensor 130 use the maximum sensitivity. It is therefore possible to obtain a sufficiently high horizontal point detection accuracy in each orientation.

Figure 11:
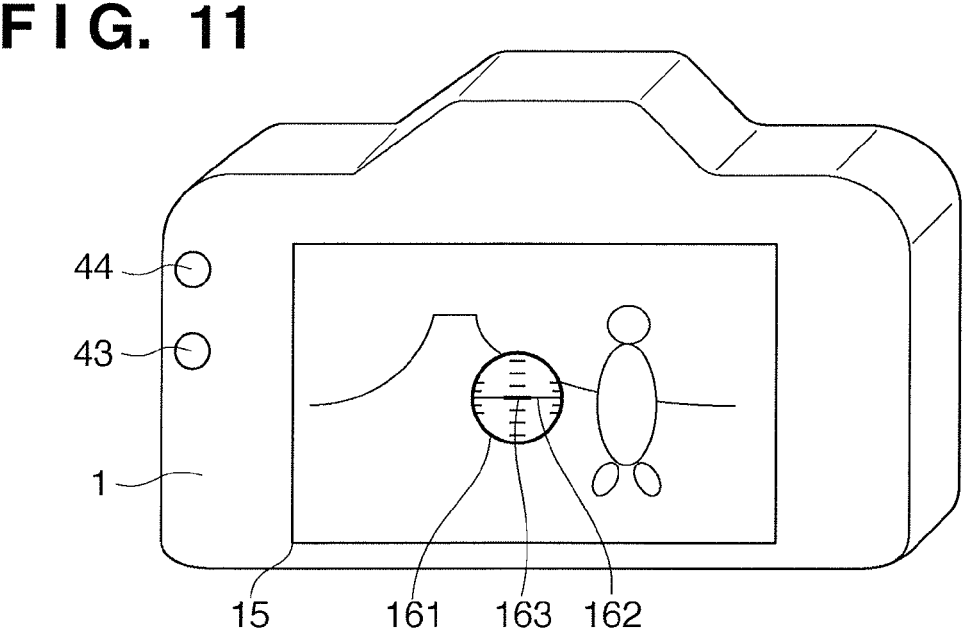
FIG. 11 is a perspective view showing a display example of an electronic spirit level according to the second embodiment in the landscape orientation.
Figure 12:
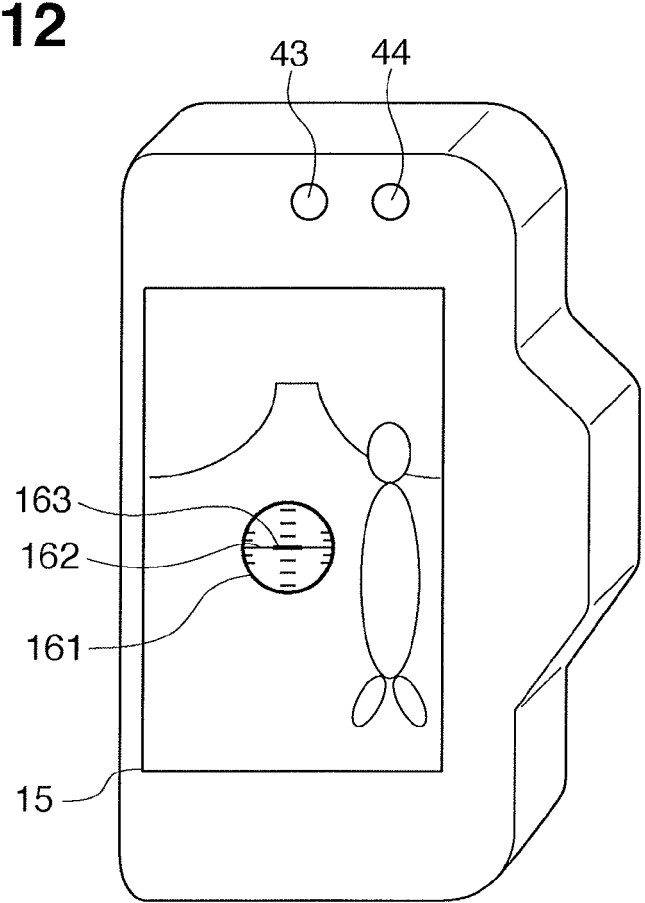
FIG. 12 is a perspective view showing a display example of the electronic spirit level according to the second embodiment in the portrait orientation.

The operation of the spirit level of the image capturing apparatus will be described next with reference to FIGS. 11, 12, and 13. FIG. 11 is a perspective view showing an example in which a captured through image and a spirit level are displayed on the display unit attached to the rear surface of the camera body. FIG. 11 shows the arrangement of the camera in the normal landscape orientation. FIG. 12 shows the arrangement of the camera in the portrait orientation (in this case, the grip faces down).

The display unit 15 is formed from a TFT liquid crystal or the like. A level indicator 161 displays the inclination degree of the camera. An indicator bar 162 indicates the inclination degree in the roll direction. When the camera body inclines in the roll direction, the relationship between the indicator bar and the scales of the level indicator in the roll direction changes accordingly. An indicator bar 163 indicates the inclination degree in the pitch direction. When the camera body inclines in the pitch direction, the relationship between the indicator bar and the scales of the level indicator in the pitch direction changes accordingly. A button SW 44 is used to set the through image mode. The MPU 3 detects press of the button SW 44, and the camera transits to the through image mode. A button SW 43 is used to set the spirit level display mode. The MPU 3 detects press of the button SW 43, and the camera adds the spirit level display to the through image display.

The operation will be described next with reference to FIG. 13. The processing from step S101 to step S105 is the same as in the first embodiment, and a description thereof will not be repeated. When the user presses the button SW 43 (part of an SW operation system 107) for the spirit level display (YES in step S105), the MPU 3 first determines the orientation of the camera, that is, the normal landscape orientation or the portrait orientation based on the data from the acceleration sensor 126 (step S106). More specifically, in the output data characteristic of the acceleration sensor 126 shown in FIG. 10, the position 145±45° is recognized as the landscape orientation, the position 146±45° as the orientation with the grip facing down, and the position 148±45° as the orientation with the grip facing up.

When the camera orientation is recognized as the landscape orientation, the MPU 3 drives the acceleration sensor 126, and reads out the measured values of the X- and Y-axes of the acceleration sensor at a predetermined time interval (step S107). The inclination degree of the camera in the roll direction is calculated by arctan(X-axis data/Y-axis data) (step S108). Next, the MPU 3 drives the acceleration sensor 130, reads out the measured values of the X- and Y-axes of the acceleration sensor at a predetermined time interval (step S109), and calculates the inclination degree of the camera in the pitch direction by arctan(X-axis data/Y-axis data) (step S110). The result is sent to the DSP 10 at a predetermined interval. Based on the result, the DSP 10 adds spirit level display to the through image on the display unit 15 (step S111). As a consequence, the camera transits to a through image capturing mode including the spirit level display (step S112). The user can capture an image while determining the presence/absence of inclination of the captured image in the roll and pitch directions.

When the camera orientation is recognized as the portrait orientation in step S106, the MPU 3 drives the acceleration sensor 126, and reads out the measured values of the X- and Y-axes of the acceleration sensor at a predetermined time interval (step S115). The inclination degree of the camera in the roll direction is calculated by arctan(X-axis data/Y-axis data) (step S116). Next, the MPU 3 drives the acceleration sensor 130, reads out the measured values of the X- and Y-axes of the acceleration sensor at a predetermined time interval (step S117), and calculates the inclination degree of the camera in the pitch direction by arctan{(X-axis data+0.7 g)/(Y-axis data+0.7 g)} (step S118). The result is sent to the DSP 10 at a predetermined interval. Based on the result, the DSP 10 adds spirit level display to the through image on the display unit 15 (step S119). As a consequence, the camera transits to a through image capturing mode including the spirit level display (step S120). The user can capture an image while determining the presence/absence of inclination of the captured image in the roll and pitch directions.

Note that both the first and second embodiments use an acceleration sensor to measure accelerations in two axis directions. Two uniaxial acceleration sensors may be used to detect accelerations in the measurement axis directions described in the embodiments. In the embodiments, the Y-axis and the X-axis intersect at a right angle. However, they need not always interest at a right angle as far as the Y-axis is symmetric to the X-axis about the axis in the gravity direction (vertical direction), and the effects of the present invention are obtained.

As described above, according to the above-described embodiments, the image capturing apparatus includes an acceleration sensor which has first and second measurement axes arranged to be symmetric to each other about the axis in the vertical direction, and measures an acceleration in the first measurement axis direction and that in the second measurement axis direction that intersects the first measurement axis direction. The arc tangent of the ratio of the acceleration due to gravity measured by the first measurement axis and the acceleration due to gravity measured by the second measurement axis is calculated, thereby obtaining the inclination degree of the image capturing apparatus around the imaging optical axis. Regarding the arrangement of the acceleration sensor, even if the mounted positions on the board or the attachment position of the board with the mounted components slightly shifts in the roll angle direction of the imaging optical axis, only executing horizontal point offset adjustment suffices. Even when the user swings the camera in the pitch angle direction, the acceleration due to gravity in the pitch angle direction almost uniformly influences the measurement axes. Hence, the influence is almost canceled in the arc tangent calculation, and the horizontal point never largely shifts. That is, it is possible to accurately detect the horizontal point in any orientation.

Even when the sensitivity or the like of the acceleration sensor has a temperature characteristic, almost the same temperature-dependent change occurs in the two measurement axes. Hence, the influence is almost canceled in the arc tangent calculation, and the horizontal point never largely shifts under a temperature environment. It is therefore possible to accurately detect the inclination degree even under a temperature environment.

In any camera orientation, the inclination degree is always detected by calculating the arc tangent of the measurement results of the two, first and second measurement axes of the acceleration sensor. This obviates the need for performing offset adjustment in each camera orientation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-195825, filed Aug. 26, 2009 which is hereby incorporated by reference herein in its entirety.

What is claimed is:
1. An image capturing apparatus comprising:
a first acceleration sensor that measures accelerations applied to the image capturing apparatus in a first measurement axis direction and a second measurement axis direction, the first measurement axis direction and the second measurement axis direction intersecting each other;

a second acceleration sensor which measures accelerations applied to the image capturing apparatus in a third measurement axis direction and a fourth measurement axis direction, the third measurement axis direction and the fourth measurement axis direction intersecting each other; and a calculation unit that calculates an inclination of the image capturing apparatus around an imaging optical axis based on an arc tangent of a ratio of an output of said first acceleration sensor in the first measurement axis direction and an output of said first acceleration sensor in the second measurement axis direction and calculates an inclination of the image capturing apparatus around an axis that intersects the imaging optical axis based on an arc tangent of a ratio of an output of said second acceleration sensor in the third measurement axis direction and an output of said second acceleration sensor in the fourth measurement axis direction, wherein said calculation unit calculates the inclination around the axis that intersects the imaging optical axis by shifting the output of said second acceleration sensor in the third measurement axis direction and the output of said second acceleration sensor in the fourth measurement axis direction by a predetermined offset amount when the inclination of the image capturing apparatus around the image optical axis is a predetermined inclination.

2. The image capturing apparatus according to claim 1, wherein the first measurement axis direction and the second measurement axis direction are symmetric with respect to an axis which is perpendicular to the imaging optical axis and the third measurement axis direction and the fourth measurement axis direction are symmetric with respect to an axis which is perpendicular to the axis that intersects the imaging optical axis.

3. The image capturing apparatus according to claim 2, wherein shift amount of the output of said second acceleration sensor in the third measurement axis direction and the output of said second acceleration sensor in the fourth measurement axis direction is determined on the basis of an inclination angle of the third measurement axis direction with respect to the axis that intersects the imaging optical axis.

4. The image capturing apparatus according to claim 3, wherein the shift amount is determined on the basis of sine of an inclination angle of the third measurement axis direction with respect to the axis that intersects the axis that intersects the imaging optical axis, at right angle.

5. The image capturing apparatus according to claim 1, wherein the axis that intersects the imaging optical axis is an axis that intersects the imaging optical axis at right angle, and wherein the inclination of the image capturing apparatus around the imaging optical axis is a rolling angle of the image capturing apparatus and the inclination of the image capturing apparatus around the axis that intersects the imaging optical axis is a pitching angle of the image capturing apparatus.

6. The image capturing apparatus according to claim 1, wherein the predetermined inclination is an inclination when the image capturing apparatus is in a portrait orientation.

7. The image capturing apparatus according to claim 1, wherein the first measurement axis direction and the second measurement axis direction are inclined with respect to the axis that intersects the imaging optical axis at right angle at 45° respectively and the third measurement axis direction and the fourth measurement axis direction are inclined with respect to the axis which intersects the axis that intersects the imaging optical axis, at right angle respectively.

8. The image capturing apparatus according to claim 1, further comprising a display control unit configured to make a display unit display information indicating the inclination calculated by said calculation unit.

* * * * *